(12) United States Patent
Westort et al.

(10) Patent No.: US 6,733,140 B2
(45) Date of Patent: May 11, 2004

(54) METHOD OF GHOST REDUCTION AND TRANSMISSION ENHANCEMENT FOR A REAL IMAGE PROJECTION SYSTEM

(75) Inventors: Kenneth S. Westort, Ithaca, NY (US); Douglas L. Robinson, Ithaca, NY (US); Randolph J. Turner, Ithaca, NY (US)

(73) Assignee: Optical Products Development Corp., Elmira, NY (US)

( * ) Notice: Subject to any disclaimer, the term of this patent is extended or adjusted under 35 U.S.C. 154(b) by 53 days.

(21) Appl. No.: 10/126,167

(22) Filed: Apr. 19, 2002

(65) Prior Publication Data

US 2003/0197839 A1 Oct. 23, 2003

(51) Int. Cl.[7] .................. G03B 21/28; G03B 21/00; G03B 21/26; G02B 27/22; G02B 27/14
(52) U.S. Cl. .................. 353/98; 353/7; 353/10; 353/122; 353/28; 353/77; 353/78; 353/99; 359/479; 359/478; 359/631
(58) Field of Search .................. 353/10, 98, 7, 353/28, 74, 77, 78, 99, 122; 359/478, 479, 629, 630, 631, 636, 638, 639

(56) References Cited

U.S. PATENT DOCUMENTS

| | | | |
|---|---|---|---|
| 3,647,284 A | 3/1972 | Elings et al. | 350/294 |
| RE27,356 E | 5/1972 | LaRussa | 350/157 |
| 4,093,347 A | 6/1978 | La Russa | 350/174 |
| 4,653,875 A | 3/1987 | Hines | 350/442 |
| 4,802,750 A | 2/1989 | Welck | 350/619 |
| 5,257,130 A | 10/1993 | Monroe | 359/478 |
| 5,268,775 A | 12/1993 | Zeidler | 359/40 |
| 5,291,897 A | 3/1994 | Gastrin et al. | 128/716 |
| 5,305,124 A | 4/1994 | Chern et al. | 359/13 |
| 5,311,357 A | 5/1994 | Summer et al. | 359/479 |
| 5,486,840 A | 1/1996 | Borrego et al. | 345/7 |
| 5,585,946 A | 12/1996 | Chern | 349/5 |
| 5,596,451 A | 1/1997 | Handschy et al. | 359/633 |
| 5,606,458 A | 2/1997 | Fergason | 359/630 |
| 5,621,572 A | 4/1997 | Fergason | 359/630 |
| 5,831,712 A | 11/1998 | Tabata et al. | 351/158 |
| 5,886,818 A * | 3/1999 | Summer et al. | 359/478 |
| 6,163,408 A | 12/2000 | LaRussa | 359/630 |
| 6,318,868 B1 | 11/2001 | LaRussa | 359/857 |
| 6,364,490 B1 * | 4/2002 | Krause | 353/77 |
| 6,445,407 B1 * | 9/2002 | Wright | 348/51 |
| 6,497,484 B1 * | 12/2002 | Hoerner et al. | 353/10 |
| 2003/0035085 A1 * | 2/2003 | Westort et al. | 353/10 |
| 2003/0035086 A1 * | 2/2003 | Robinson et al. | 353/10 |

FOREIGN PATENT DOCUMENTS

| | | | |
|---|---|---|---|
| JP | 07 043634 | 2/1995 | G02B/27/02 |
| JP | 08 152579 | 6/1996 | G02B/27/28 |
| WO | WO 00/65844 | 11/2000 | H04N/9/30 |

OTHER PUBLICATIONS

Jenkins, Francis A and White, Harvey E. "Fundamentals of Optics". McGraw–Hill Publishing Company Ltd. 1937.

* cited by examiner

Primary Examiner—Russell Adams
Assistant Examiner—Melissa J Koval
(74) Attorney, Agent, or Firm—Brown & Michaels, PC

(57) ABSTRACT

A real image projection system includes at least one curved reflector, positioned in a tilted configuration, wherein an optical axis of the reflector is not coincident with a viewing axis, and a beampath between a target source and the curved reflector neither passes through nor reflects off of a beamsplitter.

19 Claims, 9 Drawing Sheets

METHOD OF GHOST REDUCTION AND TRANSMISSION ENHANCEMENT FOR A REAL IMAGE PROJECTION SYSTEM

BACKGROUND OF THE INVENTION

1. Field of the Invention

The invention pertains to the field of real image projection systems. More particularly, the invention pertains to a real image projection system having a tilted curved reflector, eliminating the need for a 50-50 beamsplitter in the system.

2. Description of Related Art

The present invention, referred to as an Ultra-High-Bright (hereinafter "UHB") display system, pertains to a real image projection system and, in particular, to a system in which an image of a real object is formed in space, giving the illusion that a real object exists at that point in space, when in reality it does not.

Visual Display systems normally use a curved reflector with a beamsplitter positioned at a 45 degree angle to the curved mirror's optical axis, to divert the input beampath at a 90 degree angle to the viewing axis or imaging beampath. This method has been used since the early 1950's for flight simulation, and is referred to as the WAC window system. These systems typically are used in an on-axis configuration, meaning that the optical axis or the un-tilted curved mirror's center of radius is located along the viewing axis. When viewing such an on-axis system, any object within the viewing area images within the system. When one looks straight at an un-tilted or on-axis curved reflector, the viewer sees an image of himself appearing upside down in the system. This generally is not a problem in flight simulators, since the cockpit typically is dark, and thus very little ghost imaging is visible.

One of the earliest working real image displays is depicted in White's 1934 publication of "Fundamentals of Optics". It shows a spherical mirror positioned behind a table. A flower vase is mounted below the table and a real image of the vase is projected sitting on the table-top. This system works, however, the viewer and room also are projected as a real image, which is known as ghosting. The White system uses an on-axis configuration, with the image being formed not at the focal point of the system or the center of radius of the curved mirror. This causes image distortion as the image deviates from the focal point of the system (center of radius).

In the late 1980's, real image display systems were developed, consisting of two on-axis parabolic reflector segments, as shown in U.S. Pat. No. 4,802,750. This at least partially solved the ghost reflection problem, however, the manufacture of parabolic sectors was extremely difficult and the product was not commercially viable. In the early 1990's, systems were built that used a beamsplitter with high reflection and low transmission to reduce the ghosting effects. This proved effective reducing the ghost image brightness from 21.5% to 5.4%, except it also reduced image transmission from 21.5% to 16.1%. Although the ghost image was much dimmer, it was still visible, and a serious distraction to the viewer.

In 1999, a system was developed using a circularly polarized window in an on-axis, WAC window style configuration, and the La Russa U.S. Pat. No. 6,163,408 was issued in 2000. This improvement effectively blocked all ghost reflections from the viewer, however the circular polarizer element had a transmission of 42%, which reduced the image brightness or transmission from 21.5% to 9%.

In 2000, a tilted system was developed, using an off-axis, curved reflector, as disclosed in International Patent Application No. PCT/US00/11234 and PCT Publication No. WO 00/65844. The system comprises a curved reflector tilted at an angle between 5 and 20 degrees from the viewing axis. A beamsplitter is positioned in the viewing axis, tilted at 45 degrees to the curved reflector axis. This is a significant improvement because it eliminates ghost imaging completely; the system no longer required a 42% transmission circular polarizer to eliminate ghosting. A 70% transmissive front window was instead used to provide a system transmission of 15%.

SUMMARY OF THE INVENTION

The goal of visual display companies has been to develop a system that has an image brightness and fields-of-view comparable to the parabolic system (e.g., U.S. Pat. No. 4,802,750), with no ghost reflections, and a system that can easily be manufactured.

The proposed UHB imaging system of the present invention incorporates a tilted mirror in conjunction with the classic single mirror imaging system depicted in White's 1934 publication of "Fundamentals of Optics". A preferred embodiment of the system of the present invention comprises a single curved reflector tilted approximately 15 degrees off-axis. The angle of tilt must be sufficient to allow the diverging beampath to strike the curved reflector without intersecting the area of the viewing window aperture. The angle of tilt preferably should be less than 17 degrees so as to minimize the effects of field curvature in the optical system. As the angle of tilt exceeds 17 degrees, the distortion caused by field curvature phenomena becomes critical. In one embodiment, light from a CRT or target object located directly below the curved reflector and facing forward, strikes a fold mirror or flat reflective surface positioned directly below the viewing window aperture with the reflective surface facing the target and curved reflector. Preferably, the fold mirror is positioned at an angle so that the light beam the monitor is reflected to the center of the curved reflector at an angle from horizontal equal to twice the tilt of the curved reflector. The diverging light beam reflects off the curved reflector and the converging beam exits on a horizontal axis, forming a real image at the focal point of the system. Because the system uses no beamsplitter, the system transmission is approximately 56% when used with a 70% Neutral Density Filter Window and 80% when used with no front window.

Now that a system transmission of 80% can be achieved, other devices can be incorporated into the real image projection system, that were not possible when system transmission was limited to 15–22%.

The present optical system exhibits more than a 300% increase in image brightness over prior art systems, and the elimination of all ghosting within the viewing area.

The present invention provides a method or optical configuration that has a high transmission or brightness, typically between 45% and 80% for the real image, with no visible ghost reflections, while maintaining a sufficient field of view or angle in which the image is visible. Another feature included in the configuration is a method of reducing the aberrations and distortions inherent in real image display systems.

A preferred embodiment of the invention is a tilted, off-axis, curved reflector of the conical family of curves, or an aspheric design. A toric curve optionally is used to reduce aberrations, inherent in off-axis systems. The curved reflector also optionally is a Mangin style reflector with two distinct curves, one on the concave and one on the convex for improved imagery. The UHB off-axis configuration can be applied to any optical imaging system incorporating a reflective imaging component that will form a real or virtual image or near-infinity image.

As an example, the optical axis of the curved mirror is tilted at a 15 degree angle to the viewing axis, with the top of the mirror leaning toward the front of the display. The target object or CRT screen is positioned under the curved reflector, facing the front of the display facing upward at 15 degrees. The diverging beampath of light from the target object or CRT strikes a vertical flat reflector or fold mirror at a 15 degree angle of incidence, reflecting at a complementary 15 degree angle and the reflected beam of light strikes the curved reflector with the axis or center of the reflected beam striking the physical center of the curved reflector. The diverging beam of light strikes the curved reflector at an angle of incidence of 15 degrees to the optical axis of the mirror. The light beam is then reflected as a converging beam of light off the curved mirror at a complementary angle of 15 degrees from the optical axis of the mirror, or along a horizontal line coincident with the viewing axis. The diverging beam of light emanating from the CRT or object and reflected off the fold mirror strikes the curved reflector at a 30 degree angle to the real image axis in relation to the vertex of the mirror surface or center of the mirror surface.

Outside light entering the window of the system, such as that reflected off the viewer or bright objects in the room, will be reflected downward by the tilted curved reflector and will not form an image in the viewing area. Therefore, visible ghost reflections are eliminated. To reduce the system size, a fold mirror optionally is positioned in the diverging beampath from the target object, to fold the beampath back into the display case. The object can then be moved to the new target focal point of the system inside of the case. The beampath length or focal length must be sufficient to allow the target object to be located outside of the beam of diverging light reflected off of the fold mirror to the curved reflector.

Optionally, a secondary target source is positioned behind the curved reflector, for example, when the curved reflector is a partially reflective beamsplitter coating, such as a 74% Reflective & 12% Transmissive coating. This allows the background image to be visible through the curved reflector. In an alternate configuration, a beamsplitter is positioned so that one edge of the beamsplitter is next to the top of the curved reflector, and the bottom edge of the beamsplitter is positioned at the bottom edge of the window aperture. The beamsplitter must allow the full converging beampath to pass through the beamsplitter, but not interfere with the diverging beampath from the target object. By using a high transmissive beamsplitter, such as an 83% transmissive and 12% Reflective coating, and positioning the background input target above the beamsplitter, a virtual image of the background target is formed floating in front of the curved reflector along a common viewing axis with the real image.

The system optionally is used with a window to isolate the inside of the display from the viewer. The window may be anti-reflective coated on one or both surfaces to reduce reflections. The window optionally is a tinted or neutral density filter, to reduce stray light from exiting the system, or it may be a circular polarizer.

DETAILED DESCRIPTION OF THE INVENTION

Definitions

Reflector—a reflective optic, referring to a substrate having a mirror coating or partially reflective coating, such as a semi-transparent beamsplitter coated optic. This coating may be either a rear or front surface coating, depending on the surface of the substrate that is used to reflect.

Asphere—a curve of conical baseline, such as spherical, parabolic, hyperbolic, or elliptical, and which includes an aspheric surface of revolution. Aspheric curves provide combinations of higher order terms in the curve formulas to create surfaces of revolution, such that, in combination, would produce imagery with reduced aberrations. Every optical system has inherent errors and aberrations as a function of natural physics, and slight curve deviations possible in an asphere will compensate for these phenomena.

Optical Aberration—a natural optical phenomenon found in all optics. The inability of lenses and mirrors to form a perfect image is due to naturally occurring phenomena called optical aberrations. It is the optical designer's task to minimize the inherent optical aberrations found within an optical system, to an acceptable level. This may be accomplished by the use of various lenses, mirrors, optical surface shapes and materials to balance and cancel defects in the image. An asphere design is a method of minimizing aberrations by optimizing optical surface shape. Common aberrations are astigmatism, chromatic aberration, coma, field curvature, distortion and spherical aberration. Aberrations affecting image quality increase as the imaging location is moved away from the focal point and optical axis of an optic. This phenomena can be minimized by maintaining the image and target object substantially at the focal point of the optical system.

Target Object—the actual object or the light source from which a real image is formed. A target or real object is defined as any source that reflects, emits, or transmits light, and includes, but is not limited to, such things as real objects, video or computer monitors, or projection devices, screens and the like.

Field-Of-View—the angle at which the full real image can be viewed.

Figure 1:
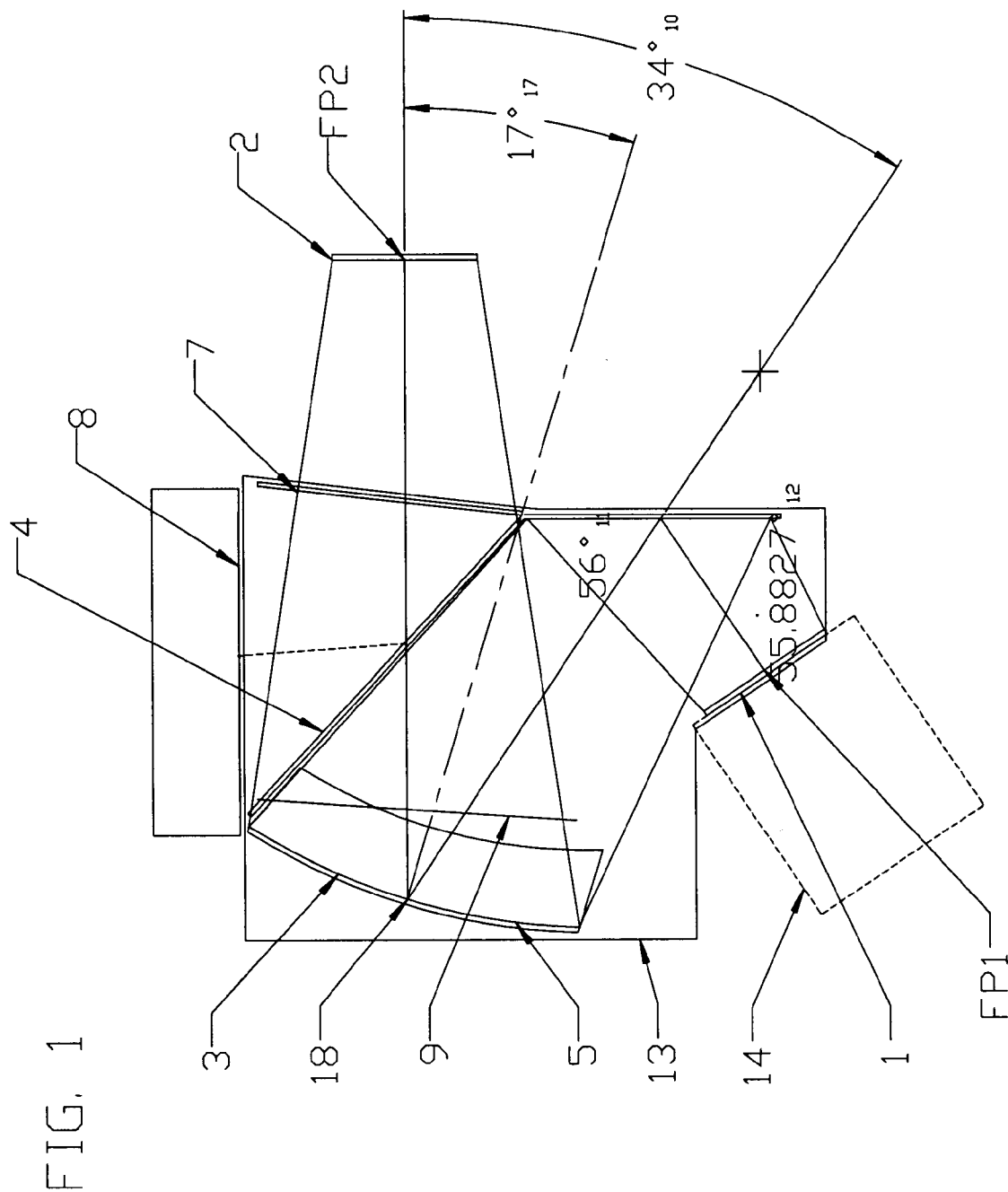
FIG. 1 is a side view of a preferred embodiment of the present invention, showing a tilted curved reflector, and a high transmissive beamsplitter with the background image source located overhead.

Referring now to FIG. 1, the target (1) may be a real object, LCD, CRT (14), or any object that transmits, reflects or emits light. Light from the target object (1), reflects off of the fold mirror (6) at a complementary angle (12, 11), to the curved reflector (3), where it again reflects off of the coated surface (5) of the curved reflector (3). The curved reflector (3) is positioned so that the beampath reflected form the fold mirror (6) strikes the curved reflector (3) at the physical center (18) or vertex of the curved reflector (3). The reflected angle (10) of the light beam reflecting off of the curved reflector surface (5) is equal to twice the angle of tilt (17) of the curved reflector (3). The imaging beam then passes through the beamsplitter (4) and then through the window (7), forming an image at the imaging focal point (FP2) of the system. In a 1× magnification system, the beampath distance between the target focal point (FP1) and the optical center (18) or vertex of the curved reflector surface (5) is equal to the radius of the curved reflector, or 2 time the EFL focal length. The Image is then formed at the imaging focal point (FP2) at a beampath distance also equal to the radius of the curved reflector (3). The background image target (8) is positioned over the beamsplitter (4), so that the virtual image (9) of the background target (8) appears to be in front of the curved reflector (3), inside of the housing (13). The beamsplitter (4) should have a higher transmission than reflection. Optimum Transmission (T%) and Reflection (R%) is about 96%T/4%R, however, other combinations will function satisfactorily.

Figure 2:
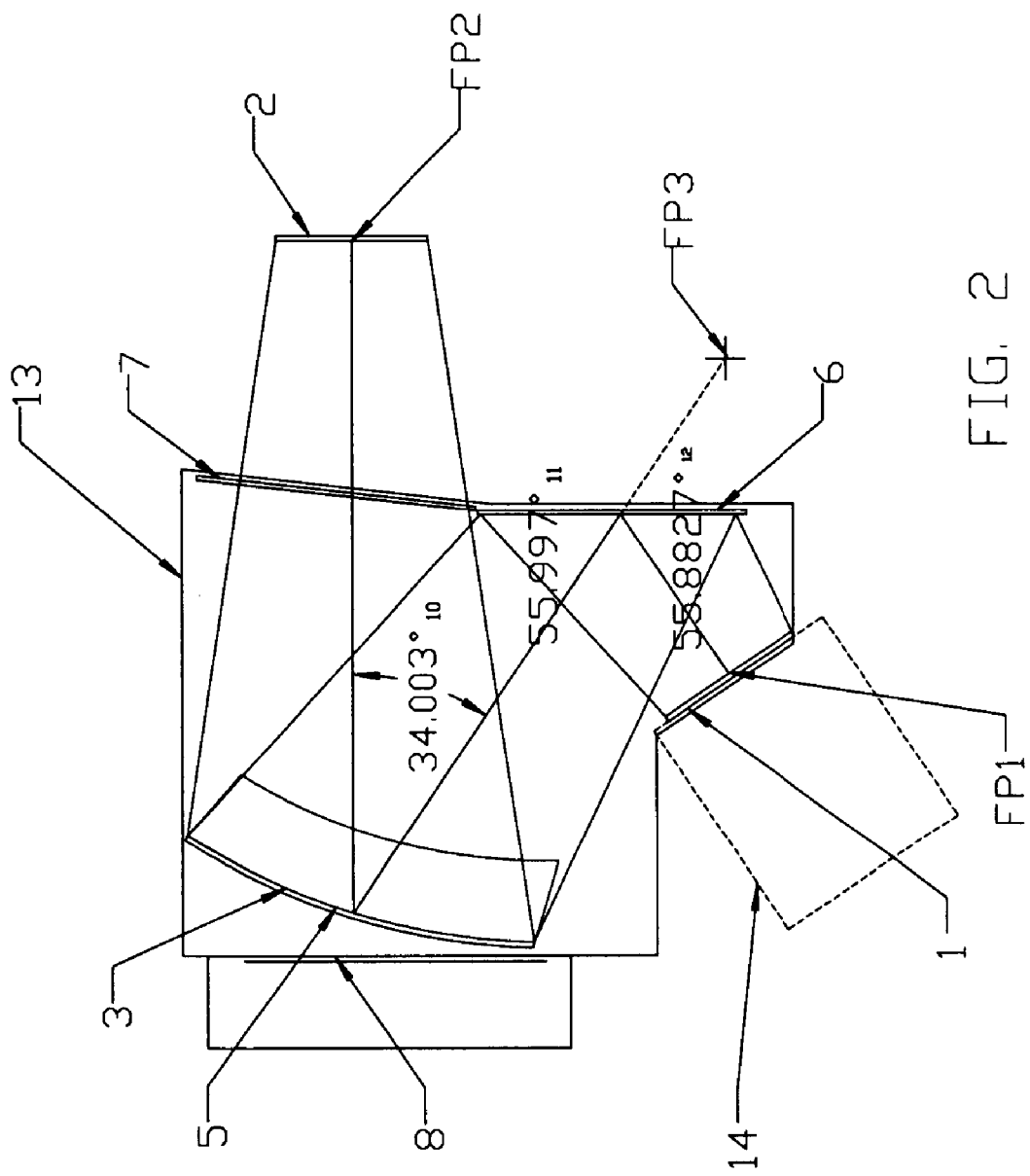
FIG. 2 shows an alternate embodiment to that of FIG. 1, showing the tilted curved reflector with a beamsplitter coating. The background image is visible through the curved beamsplitter, thus eliminating the need for an additional tilted flat beamsplitter.

FIG. 2 shows essentially the same configuration as in FIG. 1, except the curved reflector (3) is coated with a beamsplitter coating or semi-transparent mirror coating (5). The reflective coating is preferably on the concave surface of the reflector, but optionally on the convex surface. If the convex surface is reflective coated, then the concave surface optionally has an anti-reflective coating applied, for example, to reduce secondary ghost imaging. As shown in FIG. 2, a second or background image source (8) is located behind the curved reflector (3) and is visible through the reflector (3), so as to allow the second image source to be visible to the viewer, while simultaneously viewing the real projected image (2). This second image source is optionally a virtual image, a real image, or an infinity image (i.e., collimated light projecting an image at infinity), as well as an actual object, monitor (14), projector, projection screen, or the like. The disadvantage of using a beamsplitter coating is that the brightness of the real image (2) is reduced, since the beamsplitter coating has a reflectivity of approximately 74%, as compared to 86% for aluminum coating in the standard system.

Figure 3:
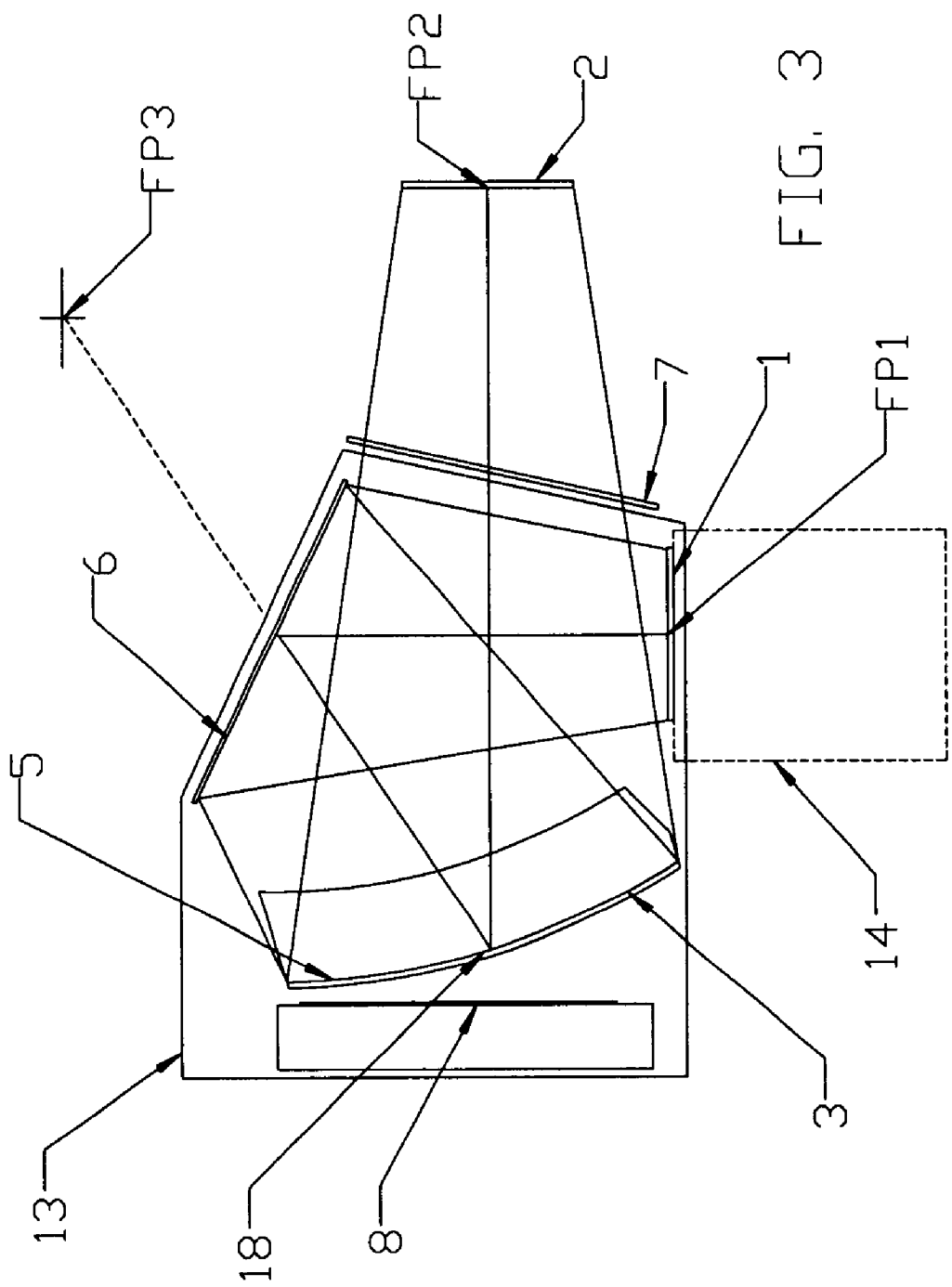
FIG. 3 is an alternate embodiment to that of FIG. 1, comprising the tilted curved reflector and a fold mirror that diverts the input beampath at a angle near 90 degrees from the imaging axis. The curved reflector may be a beamsplitter coating to allow the use of a secondary background image.

FIG. 3 shows an alternate configuration of the system. In this system, the fold mirror (6) is positioned at an angle such that the diverging beampath from the target (1) focal point (FP1) to the fold mirror (6) crosses the imaging beampath from the vertex or optical center (18) of the curved reflector (3), to the imaging focal point (FP2), where the real image (2) is formed. The diverging beampath from the target focal point (FP1) strikes the fold mirror (6) which is positioned at an angle so that the reflected beampath is directed to the optical center (18) on the curved reflector (3). This system allows an extremely compact footprint.

When a secondary background Image (8) is required, the curved reflector (3) is coated with a beamsplitter coating (5) so that the background target (8) is visible through the curved reflector. It background image source (8) may be as an actual object, monitor (14), projector, projection screen, or anything that reflects, transmits, or emits light, including a gas plasma or LCD screen showing real-time video. The beamsplitter coating (5) applied to the curved reflector (3) should have a higher reflection than transmission. With a bright background source (8), the optimum beamsplitter coating (5) may be 74% reflective, 12% transmissive aluminum coating, however, any beamsplitter coating including multi-layer dielectric coatings are acceptable also.

Figure 4:
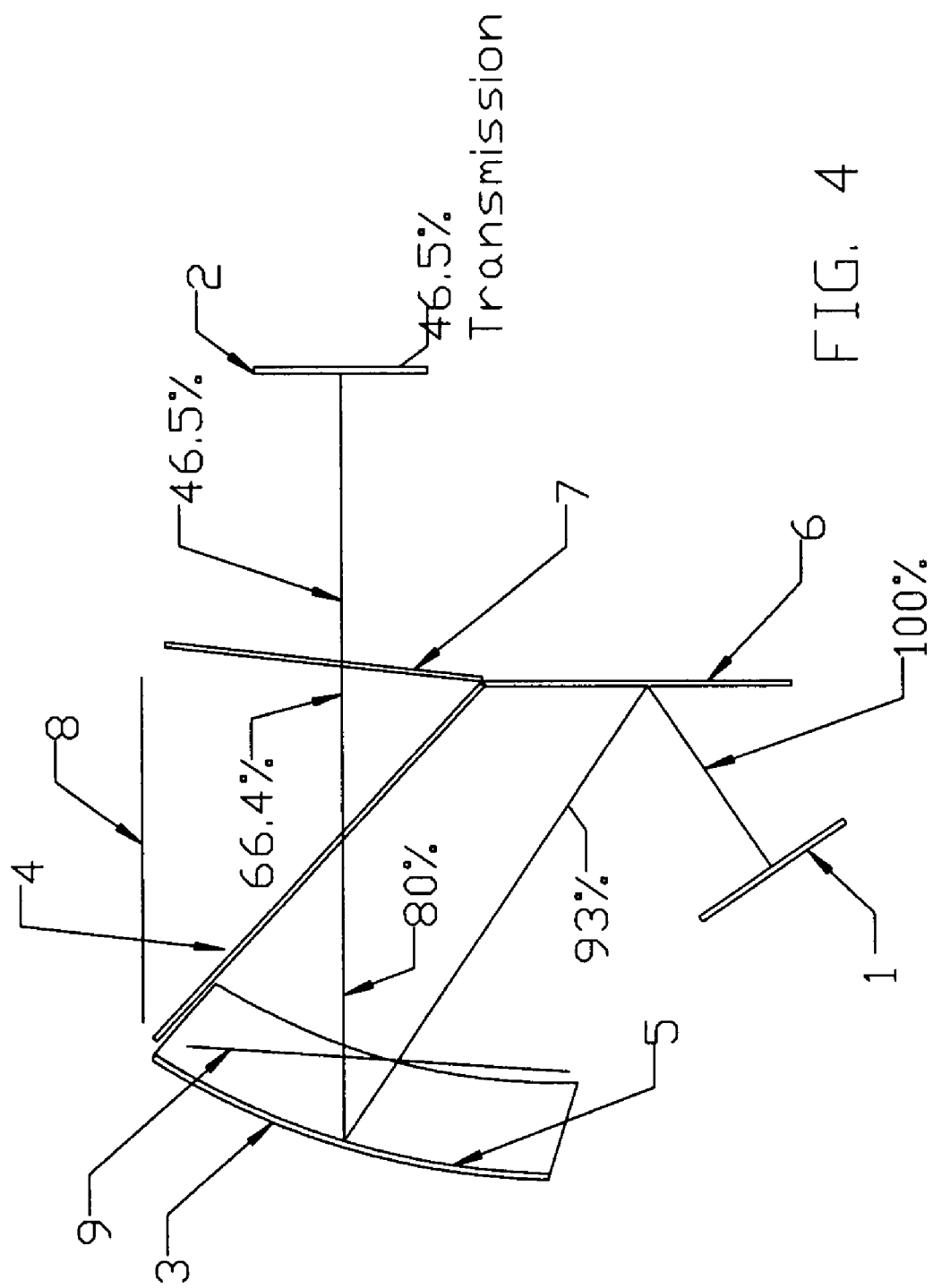
FIG. 4 is a beam-path ray-trace layout of the UHB invention, showing the transmission characteristics of the system depicted in FIG. 1.

FIG. 4 shows an example of typical transmission characteristics of the system depicted in FIG. 1. Light from the target object (1) is projected at 100% brightness. The beampath reflects at 93% brightness (100%×93%) off of a fold mirror (6) which is coated with a 93% reflective enhanced aluminum coating. The light beam then reflects off of the curved reflector (3) surface (5) which is coated with an Aluminum Coating (AlSiO2), having an 86% Reflection, resulting in a brightness of 80% (93%×86%). The light beam then transmits through the beamsplitter (4) which is coated with an 83% transmissive/12% reflective coating. The resulting brightness is 66.4% (80%×83%). The beampath then transmits through the window (7) which is a 70% transmissive neutral density filter. The resulting brightness of the light beam exiting the window (7) which forms the real image is 46.5% (66.4%×70%), as compared to the original target (1) brightness of 100%. Other coating types and reflectivity are also acceptable.

Light from the background source (8) is 100%, and reflects off of the beamsplitter coating (4) at 12%, forming a background image (9) which is 12% of the original background target (8) brightness. It is important to have the real image (2) brightness (46.5%) much greater than the background image (9) brightness (12%) so that the background is not visible through the real image, in order for the real image (2) to appear solid and real. Another optional beamsplitter material would be clear glass which has a normal reflectivity of 4%, with an antireflective coating applied to the opposite side resulting in 0.2% reflectivity. This would act as a 96%T/4%R beamsplitter, improving overall transmission of each of the systems.

Figure 5:
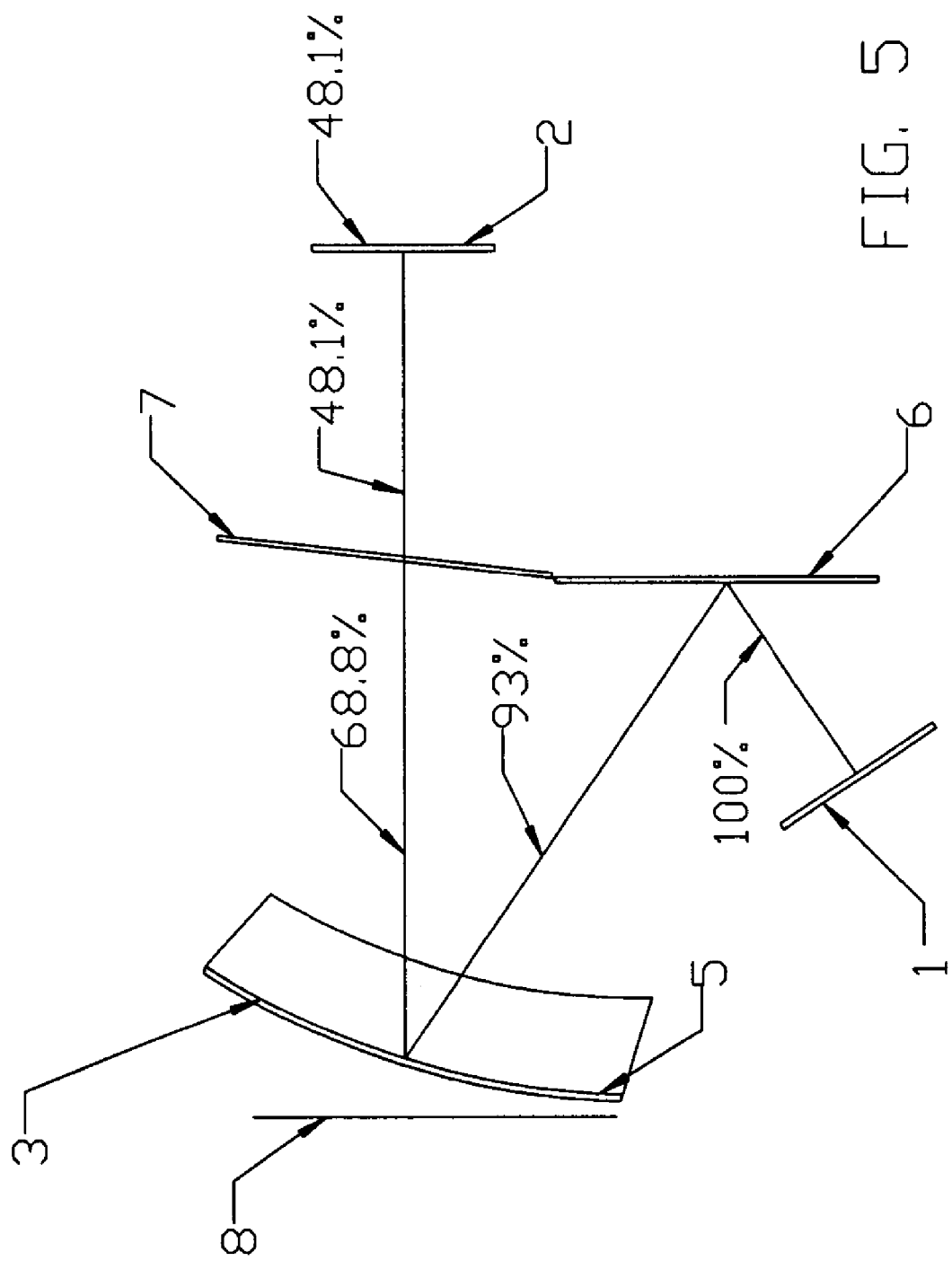
FIG. 5 is a beam-path ray-trace layout of the invention, showing the transmission characteristics of the system depicted in FIG. 2.

FIG. 5 shows an example of typical transmission characteristics of the system depicted in FIG. 2. Light from the target object (1) is projected at 100% brightness. The beampath reflects at 93% brightness (100%×93%) off of a fold mirror (6) which is coated with a 93% reflective enhanced aluminum coating. The light beam then reflects off of the curved reflector (3) surface (5) which is coated with a partially reflective Aluminum Coating (AlSiO2) or beamsplitter coating, having an 74% reflection and 12% transmission, resulting in a brightness of 68.8% (93%× 74%). The beampath then transmits through the window (7) which is a 70% transmissive neutral density filter. The resulting brightness of the light beam exiting the window (7) which forms the real image is 48.1% (68.8%×70%), as compared to the original target (1) brightness of 100%.

The background image (8) is formed by directly viewing the background target (8) through the beamsplitter coating (5) applied to the curved reflector (3). The background image brightness is 12% (100%×12%). If a background image (8) is not required in the system, a 86% Aluminum coating (5) on the curved reflector (3) would result in a real image (2) brightness of 56%.

Figure 6:
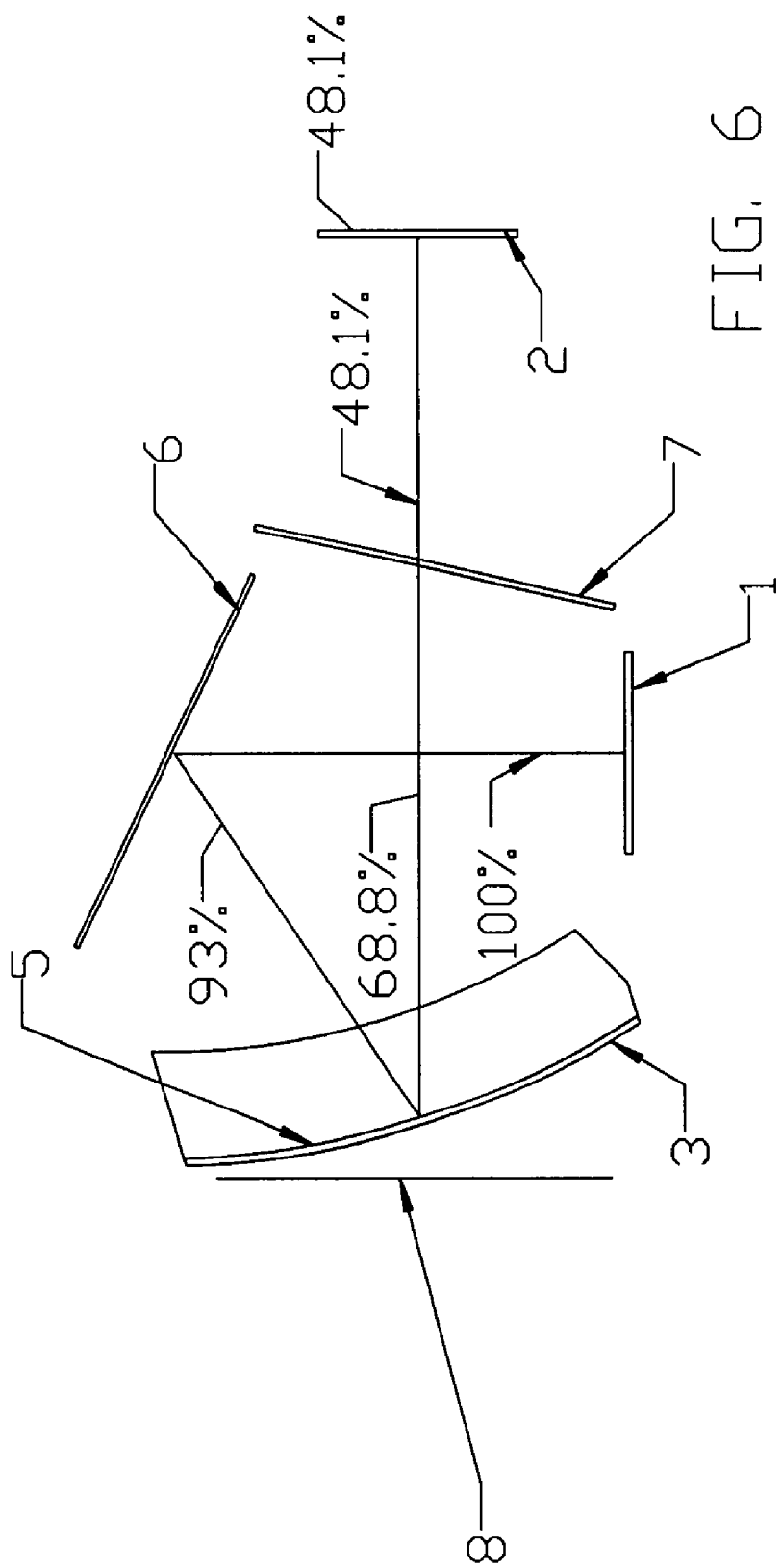
FIG. 6 is a beam-path ray-trace layout of the invention, showing the transmission characteristics of the system depicted in FIG. 3.

FIG. 6 shows an example of typical transmission characteristics of the system depicted in FIG. 3. This configuration has an identical transmission characteristics as depicted in FIG. 5.

Figure 7:
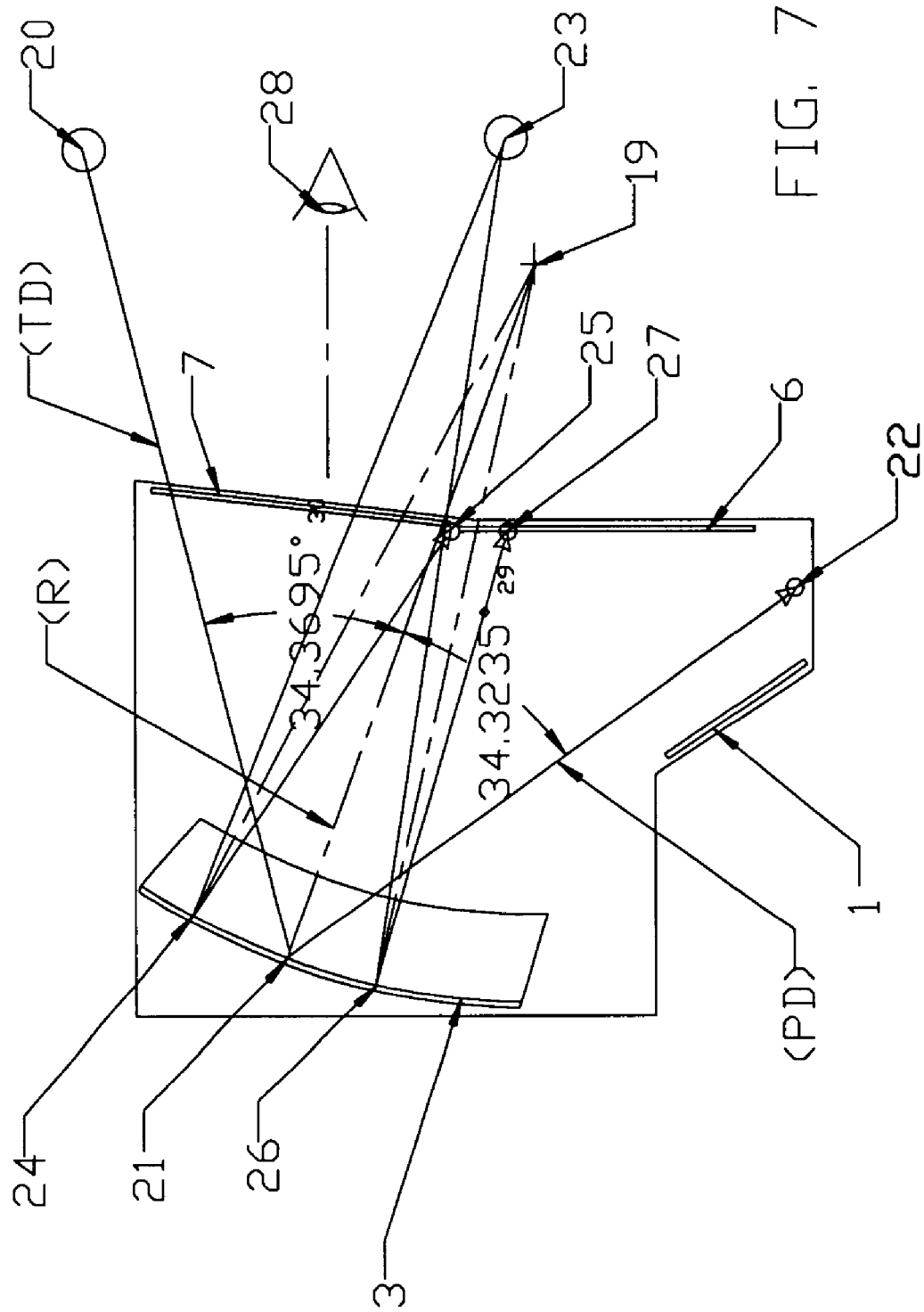
FIG. 7 shows the ghost reflection characteristic of the tilted system depicted in FIG. 1.

FIG. 7 shows the Ghost Image characteristics of the proposed systems depicted in FIG. 1. All systems shown in FIG. 1, FIG. 2, and FIG. 3 have similar characteristics. In FIG. 7, light from an external source (20) such as lights in the room, or brightly lit objects, enters through the window (7), striking the curved reflector (3). The light striking the surface (21) of the curved mirror (3) is reflected, and forms an image along the line of the reflected beampath (20,22). The image is formed at a position (22) where the viewer (28) cannot see the ghost image (22) since it does not exit the window (7). Light sources even at low positions (23) within the room will reflect (26) off the curved reflector (3) and form an image (27) at a point within the system case (13) and will not exit the window (7), and therefore is not visible to the viewer (28). Thus ghosting in the proposed systems is totally eliminated.

The following is the calculation method for determining positions and view angles of Ghost reflections in the proposed system. To calculate the position of ghosting within a system, The following formulas apply:

To calculate the distance from the curved reflector surface (3) in which the ghost image (22) is formed:

PD=Projection Distance From Curved Reflector (21,22)

TD=Target Distance From Curved Reflector (20,21)

R=Mirror Radius or 2×Focal Length or EFL (21,19)

Therefore PD=1/[(2/R)−(1/TD)]

To calculate the angle at which the ghost image (22) is reflected off of the curved reflector (3):

TA=Target Angle (30) of the light beam from the target (20) to a point (21) on the surface of the curved reflector (3) relative to an imaginary line from the center of radius (19) of the curved reflector to the point (21) on the reflector surface where the beam strikes.

RA=Angle of Reflection (29) off of the curved reflector relative to the imaginary line from the center of radius (19) of the curved reflector to the point (21) on the reflector surface where the beam strikes.

TM=Angle of Tilt of Curved Reflector (3) relative to Vertical.

Therefore the angle of reflection RA+TA

Therefore angle of reflection compared to Horizontal= RA+TA+MA

As an example, outside light source (20) is entering the window at a downward angle of 15 degrees to horizontal. The axis (21,19) of the curved reflector (3) is tilted downward 15 degrees from horizontal. The Target Angle (30) of the outside light source (20) is 30 degrees from the axis (21,19) of the curved reflector (3). The light is reflected at a complimentary angle (29) of 30 degrees to the axis (21,19) of the curved reflector (3). The light therefore, is reflected downward at 45 degrees (RA+MA) or 30 degrees plus the mirror tilt of 15 degrees, from horizontal.

Now assuming the radius of the curved reflector is 35" (R), and the outside light source (20) is located at 240 inches (TD) from the position where it strikes (21) the curved reflector (3), the ghost image (22) is formed at a distance of 18.9" (PD) from the reflection point (21) on the curved reflector (3), along the beampath defined previously between points 21 and 22. Or 45 degrees downward from horizontal. This is calculated as:

PD=1/[(2/R)−(1/TD)]

PD=1/[(2/35)−(1/240)]=1/[0.05714−0.00417]

PD=1/0.05298=18.876"

Figure 8:
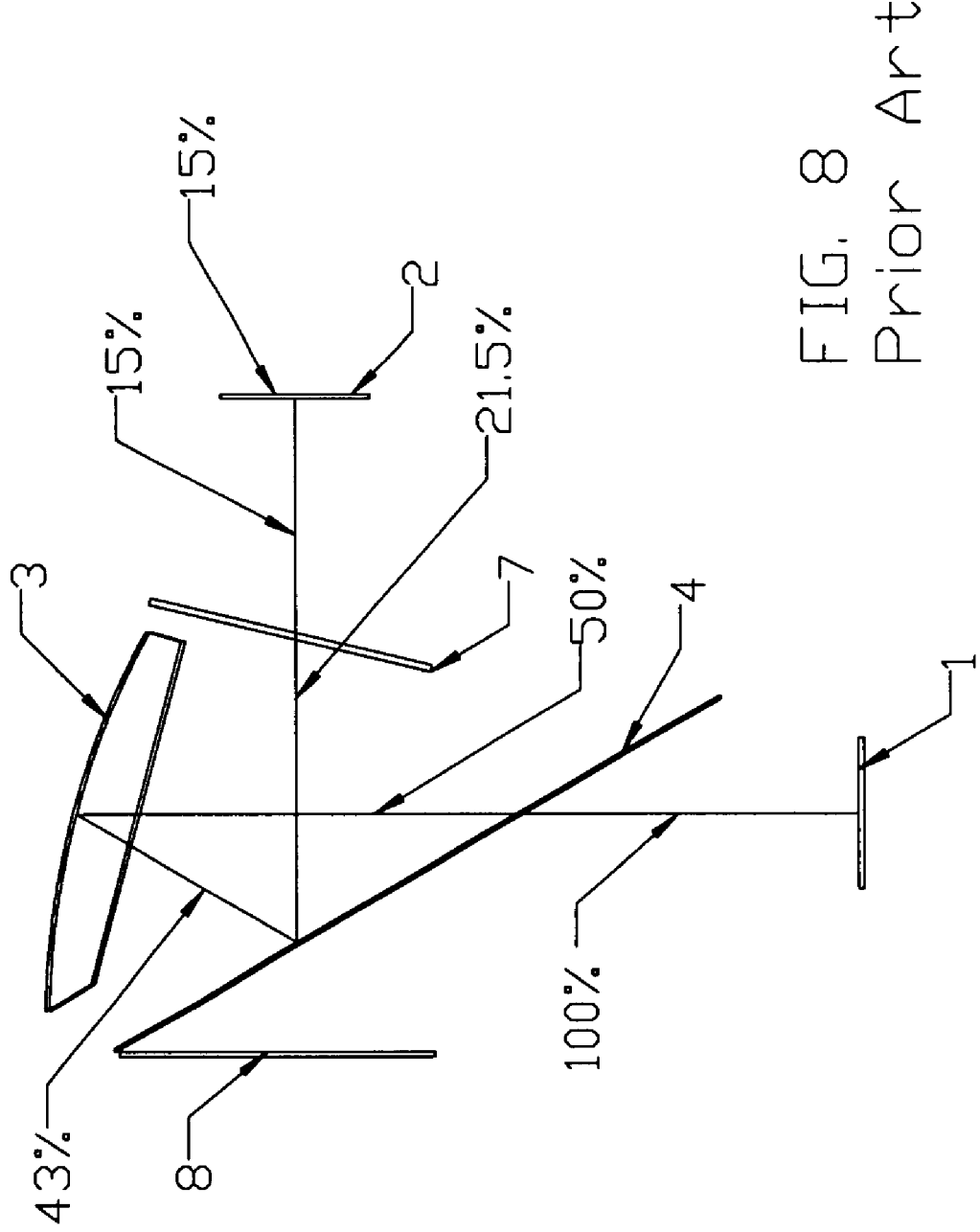
FIG. 8 shows a prior art tilted system using a tilted 50-50 beamsplitter and the transmission characteristics of the system.

FIG. 8 shows a prior art system using a tilted curved reflector. It has similar ghost reduction benefits as those shown in FIG. 7, however the transmission of the system is 15% compared to 46.5% as depicted in FIG. 1 and FIG. 4, as used in the proposed invention.

Figure 9:
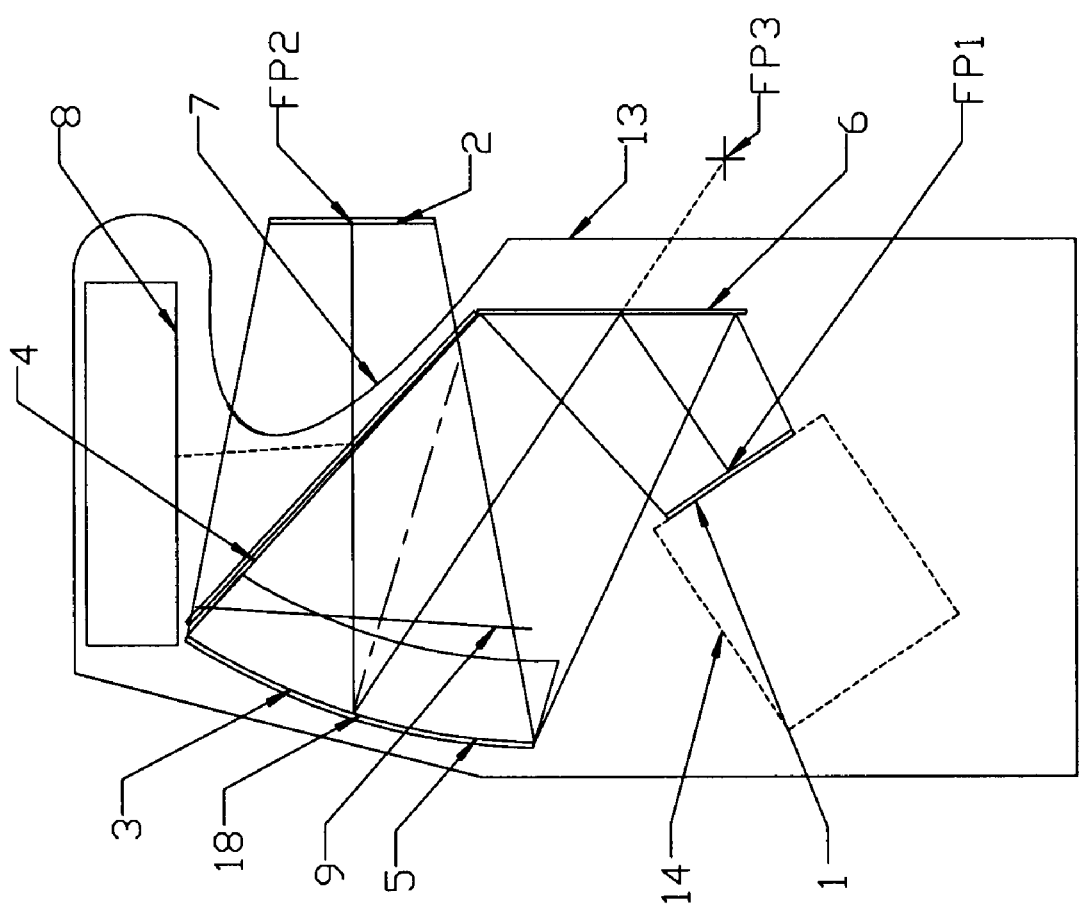
FIG. 9 shows a UHB system in a hooded enclosure that will reduce internal imaging of external light sources.

FIG. 9 shows the UHB system in an enclosure with a hooded top enclosing the background target source (8) and no front window (7). In the example shown The light from the target source (1) monitor (14), reflects off the fold mirror (6) and strikes the curved reflector (3) centered at the vertex (18) or physical center of the curved reflector (3). The light then passes through the beamsplitter (4) and forms a real image (2) at the focal point (FP2) of the system. The beamsplitter (4) in the system acts as a front window to the system and the upper sides (7) of the cabinet (13) are recessed back to enhance the 3D effect. The system can be de-magnified by moving the real image target monitor (1) off of the focal point (FP1) increasing the beampath length from the target (1) to the vertex (18) of the curved mirror (3) as compared to the beampath length between the focal point (FP1) and the vertex (18) of the curved reflector (3). This will reduce the projection distance from the system imaging focal point (FP2) to the position in which the real image (2) is formed. Light from the background monitor (8) or secondary virtual image target strikes the beamsplitter (4) and reflects at an angle coincident with the viewing axis (18) to (FP2). A virtual image (9) of the secondary target or monitor (8) is formed in front of the curved reflector (3).

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A real image projection system, comprising at least one curved reflector positioned in a tilted configuration relative to a viewing axis of said system, such that an optical axis of said curved reflector is tilted at an angle between twelve and twenty degrees from horizontal of the viewing axis.

2. The real image projection system of claim 1, wherein said angle is about fifteen degrees.

3. The real image projection system of claim 1, comprising a fold mirror or reflective surface positioned at an angle such that light from a target source is reflected and directed to an approximate center or vertex of said curved reflector.

4. The real image projection system of claim 3, wherein an angle of a reflected light beam from said fold mirror, relative to said viewing axis, is about twice the angle of tilt of said curved reflector, in relation to said viewing axis.

5. The real image projection system of claim 4, wherein an angle of said fold mirror relative to vertical is varied to allow said target source to be positioned so as not to intersect a reflected light beam from said fold mirror to said curved reflector.

6. The real image projection system of claim 1, further comprising a beamsplitter positioned so as to intersect a beampath from said curved reflector to a real image.

7. The real image projection system of claim 6, wherein said beamsplitter does not intersect a beampath from a first target source, reflecting off a fold mirror or flat reflector to said curved mirror.

8. The real image projection system of claim 7, wherein said beamsplitter is positioned at an angle such that light from a second target source forms a virtual image on said viewing axis of said system.

9. The real image projection system of claim 8, wherein said second target source is selected from the group consisting of:

a) a real object;

b) a monitor;

c) a projector or projection screen;

d) a video image;

e) a graphic rendering; and f) a screen-borne image.

10. The real image projection system of claim 1, wherein said curved reflector includes a beamsplitter coating applied to at least one concave or convex surface thereof.

11. The real image projection system of claim 10, further comprising a cabinet or chassis, with an area of said cabinet sides between a beamsplitter and an observer cut away or open to allow a real image to be projected in space, while providing a hooded top to reduce stray light entering said system from overhead.

12. The real image projection system of claim 1, wherein a secondary target source is positioned behind a beamsplitter along said viewing axis, and is visible through said beamsplitter.

13. The real image projection system of claim 1, where a target source for said real image is a CRT, projection screen, real object, or anything that reflects, emits, or transmits light.

14. The real image projection system of claim 1, wherein any optical surface therein that is not coated with a reflective coating is coated with an anti-reflective coating to reduce secondary and ghost imaging.

15. The real image projection system of claim 1, further comprising a beamsplitter of neutral density substrate, positioned intersecting an imaging beam from said curved reflector to a real image, but not intersecting a target beam between a fold mirror and said curved reflector.

16. The real image projection system of claim 15, wherein said neutral density beamsplitter is positioned at an angle such that light from a second target source overhead forms a virtual image on said viewing axis of said system, to both project a virtual image of a background target along said viewing axis, and to serve as a front window of said system.

17. The real image projection system of claim 1, further comprising a circular polarizer window for preventing stray light entering from outside said system, and from exiting said system and being visible to an observer outside thereof.

18. The real image projection system of claim 17, further comprising a beamsplitter coating or surface on an outer surface of said circular polarizer.

19. The real image projection system of claim 1, further comprising a cabinet and a tilted beamsplitter that also serves as a front window of said system.

* * * * *